(12) United States Patent
Stritzel et al.

(10) Patent No.: US 8,627,284 B2
(45) Date of Patent: Jan. 7, 2014

(54) MANAGED SYSTEM EXTENSIBILITY

(75) Inventors: Adam D. Stritzel, Redmond, WA (US); Adriaan W. Canter, Seattle, WA (US); Eric P. Traut, Bellevue, WA (US); Suyash Sinha, Snohomish, WA (US); Tahsin Erdogan, Redmond, WA (US); Dattatraya B. Rajpure, Redmond, WA (US); John M. Sheehan, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 12/488,164

(22) Filed: Jun. 19, 2009

(65) Prior Publication Data

US 2010/0325085 A1 Dec. 23, 2010

(51) Int. Cl.
*G06F 9/44* (2006.01)
*G06F 7/00* (2006.01)

(52) U.S. Cl.
USPC .......................................... 717/120; 707/609

(58) Field of Classification Search
None
See application file for complete search history.

(56) References Cited

U.S. PATENT DOCUMENTS

| | | | |
|---|---|---|---|
| 5,526,523 A | 6/1996 | Straub et al. | |
| 5,903,753 A | 5/1999 | Bramnick et al. | |
| 6,008,806 A | 12/1999 | Nakajima et al. | |
| 2005/0177581 A1 | 8/2005 | Sezgin et al. | |
| 2007/0156913 A1 | 7/2007 | Miyamoto et al. | |
| 2008/0021921 A1 | 1/2008 | Horn | |
| 2008/0256095 A1 | 10/2008 | Wakefield | |
| 2009/0141110 A1* | 6/2009 | Gervasi et al. | 347/100 |

FOREIGN PATENT DOCUMENTS

CN 101167053 4/2008

OTHER PUBLICATIONS

"Managed Extensibility Framework", Retrieved at<<http://www.devtopics.com/managed-extensibility-framework/>>, Mar. 2003, p. 1.
Hackett Scott, "Plug-in Extensibility through Reflection in .Net and Java", Retrieved at<<http://blog.slickedit.com/?p=217>>, Feb. 20, 2008, pp. 6.
Bershad, et al."Extensibility, Safety and Performance in the SPIN Operating System", Retrieved at<<http://www-cse.ucsd.edu/~savage/papers/Sosp95.pdf>>, pp. 17.
"TEP: Common Category Framework (CCF)", Retrieved at<<http://t3flyers.wordpress.com/2006/09/14/tep-common-category-framework-ccf/>>, Sep. 14, 2006, pp. 12.
"Firefox Mass Extensions Manager 1.0 description", Retrieved at<<http://wareseeker.com/Network-Internet/firefox-mass-extensions-manager-1.0.zip/3505180>>, p. 1.
Ghormley, et al."Interposition as an Operating System Extension Mechanism", Retrieved at<<http://www.eecs.berkeley.edu/Pubs/TechRpts/1996/CSD-96-920.pdf>>, pp. 1-14.

(Continued)

*Primary Examiner* — Hyun Nam
(74) *Attorney, Agent, or Firm* — Wolfe-SBMC

(57) ABSTRACT

One or more extension registrations are received for each of multiple software components installed on a computing device. The one or more extension registrations identify the software components as providers of functionality. A record of the one or more extension registrations for each of the multiple software components is maintained. Requests are received, from other software components installed on the computing device, that identify particular functionality. In response to such requests, the information regarding one or more of the multiple software components that provide the particular functionality is returned to the other software components.

19 Claims, 10 Drawing Sheets

(56) References Cited

OTHER PUBLICATIONS

"Extensible Operating Systems", Retrieved at<<http://www.cs.unm.edu/~riesen/prop/node26.html>>, p. 1.

"International Search Report", Mailed Date: Feb. 8, 2011, Application No. PCT/US2010/039117, Filed Date: Jun. 18, 2010, pp. 8.
"Foreign Office Action", Chinese Application No. 201080027255.7, (Jun. 8, 2013), 14 pages.

* cited by examiner

MANAGED SYSTEM EXTENSIBILITY

BACKGROUND

A computer typically runs an operating system that provides various functionality including allowing other applications to be installed and run on the computer. Such an operating system oftentimes provides a location where applications can store information serving to register the applications as providing certain functionality to other applications and thereby extending the functionality of the operating system. This location could be, for example, an operating system registry. While maintaining such information can be beneficial to the applications, current storage mechanisms are not without their problems.

One such problem is that different applications typically interact with the same location, allowing situations to arise where information stored by one application is deleted, overwritten, or otherwise corrupted by another application. Such situations can result in applications not running and providing their intended functionality. Another such problem is that applications are typically responsible for removing their information from that location when they are uninstalled. If applications do not remove their information correctly, at any given time the location can store information indicating certain applications are available to run even though those applications have been uninstalled and are not actually available to run.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, one or more extension registrations are received for each of multiple software components installed on a computing device. The one or more extension registrations identify the software components as providers of functionality. A record of the one or more extension registrations for each of the multiple software components is maintained. Requests are received, from other software components installed on the computing device, that identify particular functionality. In response to such requests, the information regarding one or more of the multiple software components that provide the particular functionality is returned to the other software components.

In accordance with one or more aspects, a new extension registration is obtained from an extension management module. The extension management module manages access to an extension registration database, and the new extension registration corresponds to an extension provider that communicates with the extension management module. Extension information based on the new extension registration can optionally be stored in a legacy store.

BRIEF DESCRIPTION OF THE DRAWINGS

The same numbers are used throughout the drawings to reference like features.

DETAILED DESCRIPTION

Managed system extensibility is discussed herein. An operating system includes an extension management module that operates as a broker between extension providers and extension consumers. An extension provider registers with the extension management module, giving the extension management module information describing the functionality provided by the extension provider. An extension consumer that desires information describing one or more extension providers that provide particular functionality makes a request to the extension management module for such information. In response to such a request, the extension management module reviews the information given by the extension providers and identifies one or more extension providers that provide the requested functionality. Information regarding these one or more extension providers is then returned to the requesting extension consumer.

Figure 1:
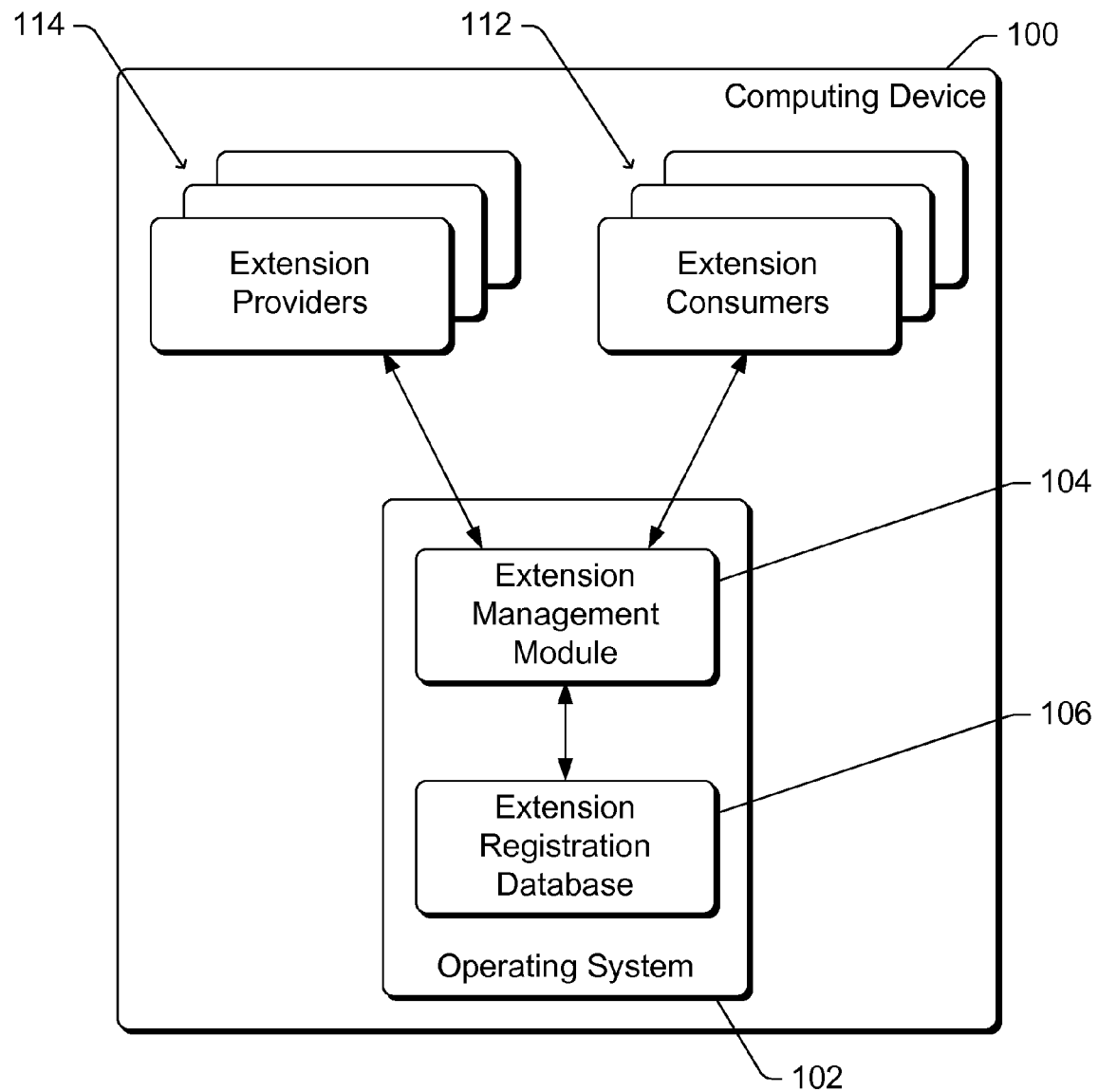
FIG. 1 illustrates an example computing device implementing the managed system extensibility in accordance with one or more embodiments.

FIG. 1 illustrates an example computing device 100 implementing the managed system extensibility in accordance with one or more embodiments. Computing device 100 can be a variety of different devices capable of running software applications. For example, computing device 100 can be a desktop computer, a server computer, a laptop computer, a mobile station, an entertainment appliance, a set-top box communicatively coupled to a display device, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes an operating system 102 having an extension management module 104 and an extension registration database 106. Computing device 100 also includes extension consumers 112 and extension providers 114. Each extension consumer 112 is a software component, and each extension provider 114 is a software component. A software component performs various operations and is included as part of a software application or software product.

The same software component can be shared by multiple such applications or products. Although illustrated as separate from operating system 102, alternatively one or more extension consumers 112 and/or one or more extension providers 114 can be components or modules of operating system 102.

Each software component includes instructions and data that can be run on computing device 100 and one or more software components provide the functionality of a software product or software application. Operating system 102 communicates with the individual software components when running, rather than with the software product as a whole.

Each extension provider 114 provides functionality that can be used by extension consumers 112. This functionality is in addition to or in place of functionality provided by operating system 102 and thus can be referred to as extending the functionality of operating system 102. It should be noted that a particular software component can be an extension consumer 112 for one type of functionality and an extension provider 114 for another type of functionality (or the same type of functionality).

Extension providers 114 can provide a variety of different types of functionality. Extension management module 104 is notified of the particular type of functionality that is provided by a particular software component when the software component is installed on computing device 100. Extension management module 104 can also be notified of additional functionality provided by a particular software component while that software component is running. A record of the particular type of functionality provided by each extension provider 114 is maintained by extension management module 104 in extension registration database 106. When an extension consumer 112 desires information regarding software components that provide particular functionality, the extension consumer 112 sends a request to extension management module 104 for such information.

For example, assume that multiple extension providers 114 provide functionality to interpret and operate on image files stored in the Joint Photographic Experts Group (JPEG) format. Each of these extension providers 114, when it is installed on computing device 100, notifies extension management module 104 that the extension provider 114 provides functionality to interpret and operate on image files stored in the JPEG format. A record of this functionality provided by these extension providers 114 is maintained in extension registration database 106. Subsequently, assume that an extension consumer 112 desires to run a software component that can interpret and operate on image files stored in the JPEG format. The extension consumer 112 sends a request to extension management module 104 for information identifying extension providers 114 that can interpret and operate on image files stored in the JPEG format. Extension management module 104 accesses extension registration database 106 to identify the extension providers 114 that can interpret and operate on image files stored in the JPEG format, and returns to the extension consumer 112 an indication of the extension providers 114 that can interpret and operate on image files stored in the JPEG format.

Generally, an extension refers to a first software component affecting the behavior of a second software component through an extension registration that is accessed by the second software component. This behavior can include, for example, invoking the first software component (e.g., invoking a traditional plug-in module), displaying information (e.g., shortcuts or menu items), and so forth. A variety of different types of extensions providing different types of functionality can be provided by extension providers 114.

Examples of such different types of extensions include file associations (e.g., software components that can interpret and operate on, also referred to as handle, particular types of files), language parsers (e.g., software components that can parse files in particular languages and/or formats), spell checkers (e.g., software components that provide spellchecking functionality), and dynamic link libraries (e.g., software components to provide particular dynamic link libraries (DLLs)). Additional examples of such different types of extensions include help files (e.g., software components that provide help information), localization files (e.g., software components that are localized to a particular language or region), plug and play (PnP) drivers (e.g., software components that provide PnP drivers), menu items (e.g., software components that provide items to be included in a menu to be displayed to a user), shortcut items (e.g., software components that provide shortcuts or links to be displayed on a particular screen or in a particular window to a user), and so forth. It is to be appreciated that, although example types of extensions are discussed herein, the managed system extensibility is not limited to these example types and can be used with other types of extensions.

Extension registration database 106 is a record of extension registration declarations that have been made by extension providers 114. Extension management module 104 manages extension registration database 106, adding extension registrations to and removing extension registrations from database 106 as appropriate. Such additions and removals are performed by module 104 in response to requests from other components or modules. Oftentimes, an installer component or module that is installing (or uninstalling) a component provides such requests for adding and removing extension registrations. However, such requests can also be received from other components or modules, such as extension providers 114.

Extension providers 114 and extension consumers 112 do not have direct access to information stored in extension registration database 106. Rather, extension providers 114 and extension consumers 112 access the information stored in database 106 via extension management module 104. Extension registration database 106 can be implemented in a variety of different manners, such as using tables, lists, database records or entries, and so forth.

Furthermore, it should be noted that the managed system extensibility discussed herein provides a centralized and common model for the registration of extensions and the discovery of extensions across multiple different types of extensions. Extension management module 104 provides a common interface for accessing extension registrations regardless of the type of the extension.

Figure 2:
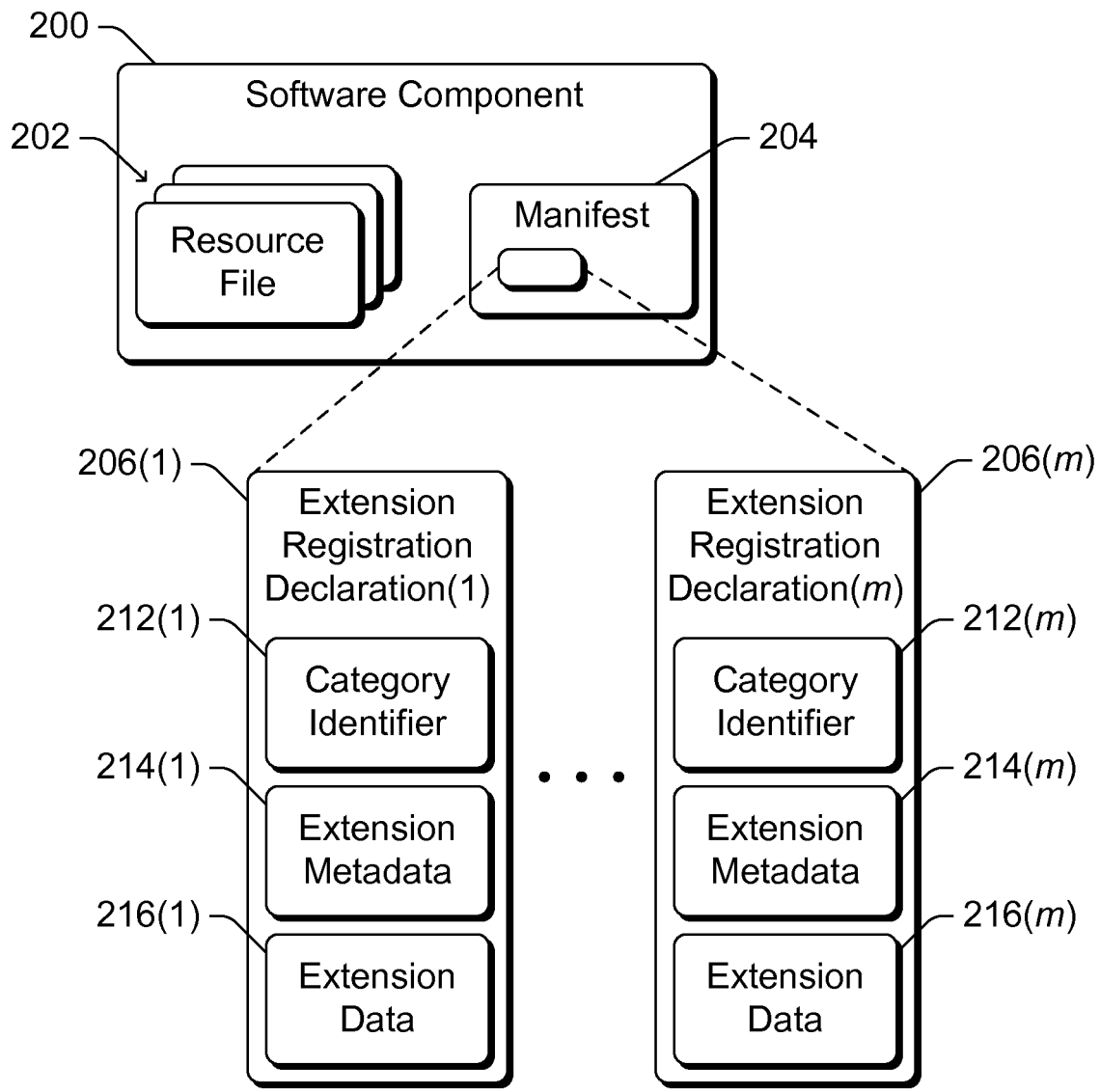
FIG. 2 illustrates an example software component in accordance with one or more embodiments.

FIG. 2 illustrates an example software component 200 in accordance with one or more embodiments. A software component is a collection of both one or more files and metadata that describes the software component. Software component 200 includes one or more resource files 202 each storing various instructions and/or data for the software component 200. The particular resource files 202 that are included in software component 200 can vary based on the desires of the developer of software component 200.

Manifest 204 stores metadata describing software component 200. In one or more embodiments, manifest 204 includes an identifier of software component 200, one or more version numbers of software component 200, and one or more extension registration declarations 206 for software component 200. The identifier of software component 200 allows software component 200 to be distinguished from other software components installed on a device. The identifier can be generated in a variety of different manners, such as based on the name assigned by the developer of software component 200, an identifier of the developer of software component 200, an identifier of the publisher or distributor of software component 200, the version number of software component 200, and so forth.

The version number of software component 200 allows different versions of software component 200 to be readily identified. In one or more embodiments, two different version numbers are included in manifest 204: a contract version (also referred to as a generational version) number and a servicing version number. Alternatively, the contract version number and servicing version number can be combined together into a multi-element number with one or more elements being the contract version number and one or more elements being the servicing version number.

Multiple (m) extension registration declarations 206 are illustrated as being included in manifest 204. Each extension registration declaration describes particular extended functionality that is provided by software component 200. For example, one extension registration declaration 206 can describe a first file association, another extension registration declaration 206 can describe a second file association, another extension registration declaration 206 can describe a spellchecker and yet another extension registration declaration can describe a shortcut item. Although multiple extension registration declarations 206 are illustrated in FIG. 2, alternatively a manifest 204 can include a single extension registration declaration or even no extension registration declarations.

Each extension registration declaration 206 includes a category identifier 212, extension metadata 214, and extension data 216. Category identifier 212 identifies the category associated with extension registration declaration 206. Each type of extension corresponds to a different category. For example, file associations correspond to one category, spell checkers correspond to another category, and so forth. The type of extension being described by extension registration declaration 206 is identified by category identifier 212.

Category identifier 212 can be a variety of different letters, numbers, symbols, other characters, and so forth. In one or more embodiments, category identifier 212 is a string of characters that is known to both extension consumers and extension providers. Accordingly, extension providers can use a particular category identifier to identify a particular type of extension and know that extension consumers are aware of that particular category identifier and can request information regarding that particular type of extension by using that particular category identifier. This requesting of information regarding extensions based on category identifier is discussed in more detail below.

Extension metadata 214 includes information describing extension registration declaration 206. A variety of different information can be included in metadata 214. Examples of such information include a name of the extension registration declaration that allows the extension registration declaration to be distinguished from other extension registration declarations, another identifier of the extension registration declaration, and so forth.

Extension data 216 includes various data for extension registration declaration 206. The particular data included can vary for different types of extensions as well as for different extensions of the same type. For example, extension data 216 can include file paths to images of icons to be displayed, file paths to executable files, file paths to DLLs, firewall rules, information regarding the category to which the extension registration declaration corresponds (e.g., for a file association an indication that the extension registration declaration is for ".jpg" files), and so forth. When information regarding extension registration declaration 206 is to be returned to an extension consumer in response to a request for information, the data in extension data 216 is returned to the extension consumer.

In one or more embodiments, the data in extension data 216 includes one or more registration parameters. Each registration parameter includes a name, type, and value. The registration parameter name is an identifier of the registration parameter allowing the registration parameter to be distinguished from other registration parameters in the extension registration declaration. The registration parameter type identifies a type of data included in the registration parameter. A variety of different setting types can be supported, such as integers, floating point numbers, Boolean values, character strings, date and/or time values, references to files or directories (e.g., by file paths), and so forth. The registration parameter value is a specific value for the registration parameter.

For example, a registration parameter could have a name of "FileAssociationName", a type of "string", and a value of ".jpg". By way of another example, a registration parameter could have a name of "ShortcutIcon", a type of "path", and a value of "image.gif".

In one or more embodiments, a category definition is defined for each category identifier. A category definition for a category identifier describes the information that is to be included in extension registration declarations having that category identifier. An extension management module (such as extension management module 104 of FIG. 1) or other component or module can optionally monitor extension registrations and return, in response to requests regarding the extension registrations, only those extension registrations which conform to the category definition for their category identifiers. Alternatively, no verification of such conformance may be performed, with extension providers and extension consumers being relied on as adhering to the category definitions.

By way of example, a category definition can have a format that includes a name, a description, one more parameters, and zero or more arrays. The category name is a category identifier as discussed above. The category description is a description of the category designed to allow development tools to assist a developer in authoring extension registration declarations. Each parameter (e.g., a registration parameter as discussed above) describes data for an extension registration declaration. Each parameter can include one or more of a name of the parameter, a type of data supported by the parameter, a minimum value for the parameter, a maximum value for the parameter, an indication of whether the parameter is required for a valid extension registration declaration, and a user-friendly, human-readable description of the parameter. Each array is a collection of zero or more parameters. Each array can include one or more of a name of the array and a user-friendly, human-readable description of the array. It is to be appreciated that this category definition format is an example and other formats including additional information and/or not including some of the information described in this example can be used.

Returning to FIG. 1, in order to run a software component on computing device 100, that software component is installed on computing device 100. The installation process is typically performed by an installation component or module, and typically includes storing files in various locations of a file system of operating system 102, storing various information describing the software component in various stores, and so forth. As part of the process of installing a software component on computing device 100, extension management module 104 is made aware of the extension registration declarations included in the manifest of the software component.

Extension management module 104 can be made aware of the extension registration declarations included in the manifest of a software component in a variety of different manners. In one or more embodiments, the manifest (or at least the extension registration declarations) is maintained in a location accessible to module 104. Accordingly, module 104 can retrieve the extension registration declarations when desired and add the extension registration declarations to extension registration database 106. Alternatively, module 104 can be made aware of the extension registration declarations in other manners, such as an installation component or module invoking a method of an application programming interface (API) exposed by module 104, an installation component or module using other operations or techniques to pass the extension registration declarations to module 104, and so forth.

Figure 3:
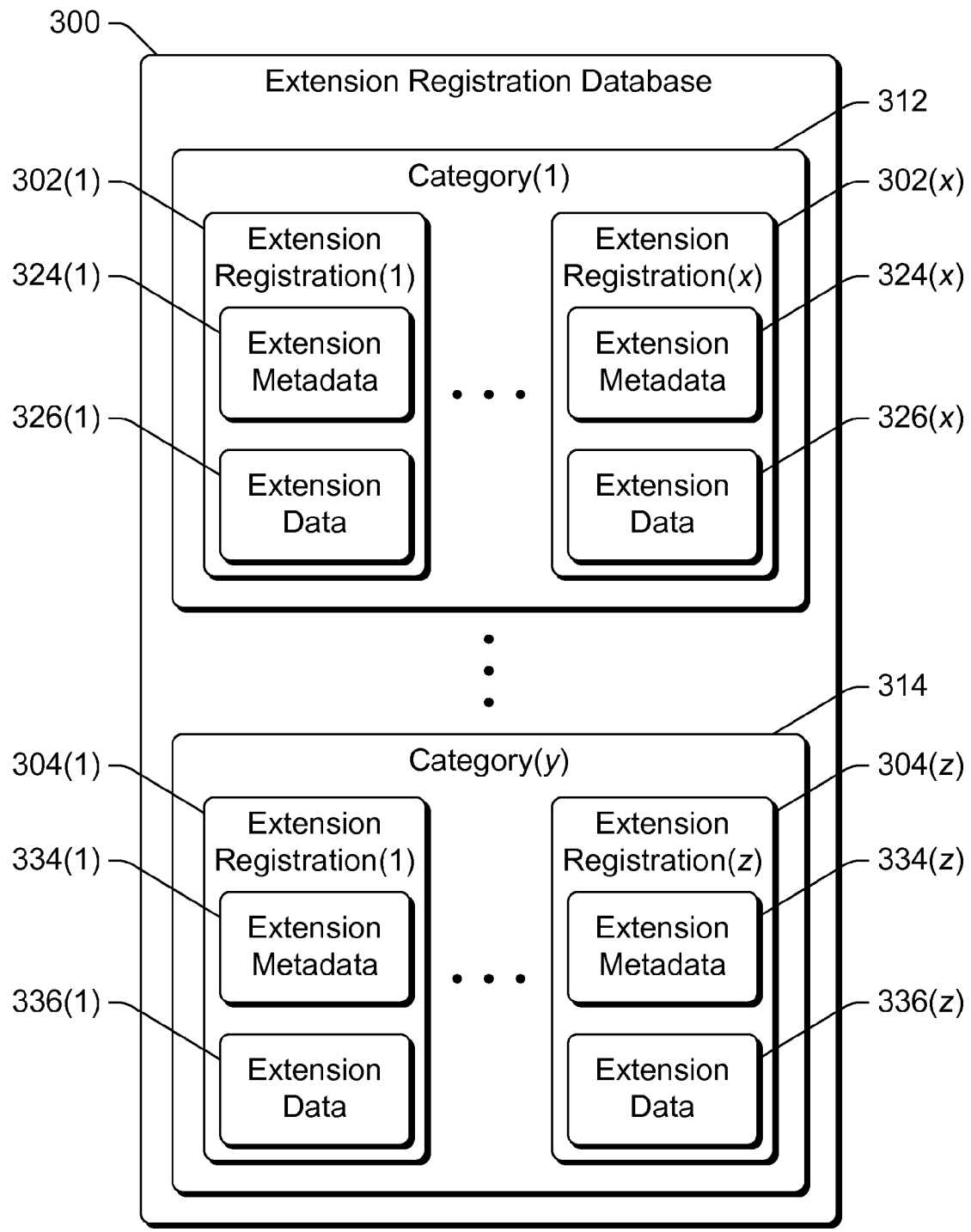
FIG. 3 illustrates an example extension registration database in accordance with one or more embodiments.

FIG. 3 illustrates an example extension registration database 300 in accordance with one or more embodiments. Extension registration database 300 can be, for example, an extension registration database 106 of FIG. 1. Extension registration database 300 includes multiple extension registrations 302 and 304. In the example of FIG. 3, the extension registrations are organized by category. For example, multiple (x) extension registrations 302 are included in a first category 312, and multiple (z) extension registrations 304 are included in a second category 314. Multiple (y) categories can be included in extension registration database 300. An extension registration declaration from a manifest of a software component (e.g., manifest 204 of FIG. 2) is obtained by an extension management module (e.g., module 104 of FIG. 1) and added to extension registration database 300 as an extension registration. For example, the information in an extension registration declaration in a manifest of a software component can be copied to an extension registration of the extension registration database.

In the example of FIG. 3, the extension registrations 302, 304 are organized by category. Each category corresponds to a category identifier (e.g., a category identifier 212 of FIG. 2). When an extension management module (such as module 104 of FIG. 1) adds an extension registration to database 300, the extension management module obtains the category identifier for the extension registration being added. If a category 312, 314 already exists in database 300 for that category identifier, then the extension registration is added to that category. However, if no such category already exists in database 300, then a new category for that category identifier is created in database 300.

Each extension registration 302 includes extension metadata 324 and extension data 326. Similarly, each extension registration 304 includes extension metadata 334 and extension data 336. Extension metadata 324 and 334 are analogous to extension metadata 214 of FIG. 2. Extension data 326 and 336 are analogous to extension data 216 of FIG. 2. Accordingly, when the extension management module adds an extension registration to database 300, both the extension metadata and the extension data obtained from the extension registration declaration in the manifest of the software component (e.g., manifest 204 of FIG. 2) can be copied to the extension registration in database 300. An extension registration declaration name or identifier included in extension metadata 214 becomes an extension registration name or identifier in extension metadata 324 or 334. The extension registration name or identifier allows the extension registration to be distinct from other extension registrations in database 300.

It should be noted that as the extension registrations are organized in database 300 by category, the category identifier obtained from the extension registration declaration in the manifest need not be maintained in the extension registration in database 300. Alternatively, the extension registrations 302, 304 can include the category identifier copied from the extension registration declaration in the manifest of the software component. In situations where the extension registration in database 300 include the category identifiers, database 300 need not be organized by category, although alternatively database 300 can be organized by category with the category identifiers still be included in the extension registrations in database 300.

Additionally, when an extension registration is added to database 300, an indication is maintained of the software component that corresponds to that extension registration (e.g., the software component that included the extension registration declaration for that extension registration). This indication can be maintained in a variety of different manners, such as by adding to the extension metadata an identifier of the software component to which the extension registration corresponds, maintaining a separate list or record of which software components correspond to which extension registrations, storing extension registrations for different software components in different locations, and so forth.

Returning to FIG. 1, when an extension consumer 112 desires information regarding extension registrations in extension registration database 106, the extension consumer 112 sends a request for information to extension management module 104. This request includes, for example, an indication of the category (the type of extension) desired by the extension consumer 112. This request can also include additional information regarding the category (e.g., for a file association the request can include an indication that information regarding extension registrations for ".jpg" files is requested).

In one or more embodiments, multiple different versions of software components can be installed on computing device 100. As discussed above, the software component can have two different version numbers: a contract version number and a servicing version number. Operating system 102 can identify software components having the same software component identifier but different contract version numbers as different software components. Accordingly, two different software components having different contract version numbers can be installed on computing device 100 concurrently. Each of these two different software components can be an extension provider 114 and have extension registrations included in extension registration database 106.

However, the operating system 102 can identify software components having the same software component identifier and contract version number to be the same software components, even if the servicing version numbers are different. Although two such software component versions can be installed on computing device 100 concurrently, one of the software components is selected as an active software component. These two software component versions can be extension providers 114, and the active software component can have extension registrations included in extension registration database 106. The other non-active software component does not have extension registrations included in extension registration database 106. When a new version of a software component that is an extension provider 114 is installed on computing device 100, the extension registrations of the previous version of the software component are removed from extension registration database 106, and extension registrations of the new version of the software component are added to extension registration database 106.

The extension registrations obtained from extension registration declarations in a manifest of a software component can also be referred to as static extension registrations. In addition, extension management module 104 can also support dynamic extension registrations. A dynamic extension registration is an extension registration performed by a software component after being installed on computing device 100. The registration can be performed in response to a user request, or alternatively in response to settings or rules followed by the software component, or in response to a request from another component or module.

A dynamic extension registration is made by the software component (typically an extension provider 114) submitting a request to add an extension registration to extension registration database 106. The request includes the metadata and data for the extension registration, including both an identifier of the corresponding software component and a category identifier, analogous to the extension registration declarations in the manifests discussed above. Extension management module 104 receives the request and adds the extension registration to extension registration database 106 in the same manner as module 104 adds static extension registrations to database 106.

By way of example, a particular extension provider 114 may be able to interpret and operate on image files in both the JPEG format and the Tagged Image File Format (TIFF) format. However, the default setting for the extension provider 114 may be to provide functionality for only images in the JPEG format. Accordingly, a static extension registration is made when the extension provider 114 is installed on computing device 100, the static extension registration indicating a file association to the JPEG format. Subsequent requests for information regarding extension registrations that provide functionality to interpret and operate on files in the JPEG format would return information regarding the extension provider 114, but requests for information regarding extension registrations that provide functionality to interpret and operate on files in the TIFF format would not return information regarding the extension provider 114.

Continuing with this example, assume that a user of the extension provider 114 subsequently inputs a request to have the extension provider 114 also be responsible for operating on images in the TIFF format. The extension provider 114 makes a request to extension management module 104 to add an extension registration to extension registration database 106. This extension registration to be added to database 106 indicates a file association of the extension provider 114 to the TIFF format. Accordingly, subsequent requests for information regarding extension registrations that provide functionality to interpret and operate on files in the JPEG format or the TIFF format would return information regarding the extension provider 114.

In addition to extension management module 104 adding extension registrations to extension registration database 106, module 104 can also remove or delete extension registrations from database 106. An extension deletion or removal is performed in response to a request by a component or module (e.g., by an uninstaller component), typically when a software component is being uninstalled from computing device 100. When uninstalling a software component, extension management module 104 deletes extension registrations from database 106 that correspond to that software component. Information indicating the software component to which each extension registration corresponds can be maintained in a variety of different manners as discussed above Accordingly, extension management module 104 can help ensure that extension registrations corresponding to a software component are removed from database 106 when the software component is uninstalled from computing device 100. Module 104 need not rely on the software component itself (or an uninstaller component associated with that software component) removing the extension registrations corresponding to that software component from computing device 100.

In one or more embodiments, various operations are supported by extension management module 104 allowing extension consumers 112 (and/or other components or modules) to access extension registration database 106. These operations can be exposed as methods of an API or alternatively requests for these operations to be performed can be made to control module 104 in other manners. In one or more embodiments, such an API can also be used by extension providers 114 to add and/or remove extension registrations from database 106. Alternatively, extension registrations can be added to database 106 in other declarative manners rather than via an API. Table I below describes an example of such operations supported by extension management module 104 in accessing extension registration database 106.

TABLE I

| Operation | Description |
|---|---|
| Enumerate registrations | Returns a list of extension registrations in the extension registration database. The caller typically specifies a category, in which case only extension registrations of the specified category are returned. |
| Get registration | Looks up an extension registration. The caller provides a component identity and an extension registration name. If the specified extension registration is found, the extension registration information (e.g., the extension data and/or extension metadata) is returned to the caller. |
| Get registration parameter | Returns the value of a specified extension registration parameter of a specified registration. Extension data and/or extension metadata can be specified and returned using this operation. |
| Add registration | Specifies an extension registration to be added to the extension registration database. |
| Get category change number | Returns a change number for the category specified by the caller. |
| Request category change notification | Allows a caller to register for a notification when an extension registration of a specified category is added to or removed from the extension registration database. Changes to the extension registration database are monitored by the extension management module and a notification is sent to the caller when an extension registration is added to or removed from the extension registration database for the registered-for category. |

Table I includes a reference to a change number for a category. In one or more embodiments, extension management module 104 maintains a different change number for each category in extension registration database 106. Module 104 modifies (e.g., increments) this change number each time an extension registration is added to or removed from extension registration database 106. A caller can use this change number in different manners. For example, an extension consumer 112 can obtain the change number for a category from extension management module 104. If the change number is the same as the previous change number that the extension consumer 112 obtained then the extension consumer knows that no changes have been made to the category since the extension consumer 112 last obtained the change number. However, if the change number is not the same as the previous change number, then the extension consumer 112 knows that an extension registration has been added to and/or removed from the category since the extension consumer 112 last obtained the change number.

Alternatively, rather than using change numbers for a category, a caller (e.g., an extension consumer 112) can determine when an extension registration has been added to and/or removed from the category in other manners. For example, a timestamp can be associated with a category. This timestamp is updated each time an extension registration is added to and/or removed from a category. The caller can obtain this timestamp and determine whether a change has been made to the category since the extension consumer last obtained the timestamp—if the timestamps are the same then no changes have been made to the category, whereas if the timestamps are different then a change has been made to the category.

Thus, it can be seen that a variety of different types of extensibility can be provided by extension providers 114, with the extension registrations being stored in extension registration database 106. The different extensibility available on computing device 100 can be readily identified by extension consumers 112 via extension management module 104 (which in turn accesses the extension registrations stored in database 106).

It can also be seen that extension management module 104 operates as a central authority via which extension providers 114 can register the extensibility that they provide and via which extension consumers 112 can access the extensibility provided by multiple extension providers 114. Rather than having extension consumers 112 provide a specific location (e.g., a particular file, a particular portion of a registry, etc.) that the extension providers 114 can modify, both consumers 112 and providers 114 interact with module 104. This centralized authority allows module 104 to, for example, maintain knowledge regarding the various extension providers 114 installed on computing device 100, and readily remove extension registrations if an extension provider 114 is uninstalled from computing device 100. This centralized authority also allows providers 114 and consumers 112 to be installed and uninstalled in different orders and at different times—no constraints on the ordering of installation or uninstallation of providers 114 and consumers 112 need be imposed by module 104.

It is to be appreciated that the managed system extensibility discussed herein provides a variety of different system extensibility scenarios. For example, an extension consumer 112 can be an operating system shell program or module that displays a user interface for operating system 102 to a user of computing device 100. Different software components that can be run by the user can be included as extension providers 114. Each extension provider can have one or more extension registrations that have registration parameters identifying a path to or location of an icon to be displayed as a shortcut on the user interface, an entry in a menu of the user interface, and so forth. Additionally, the one or more extension registrations can include registration parameters identifying paths to locations where executable files for the corresponding software components are stored. In response to a user selection of such an icon or menu entry, the path to the executable file for the corresponding software component can be readily identified and the executable file run.

Figure 4:
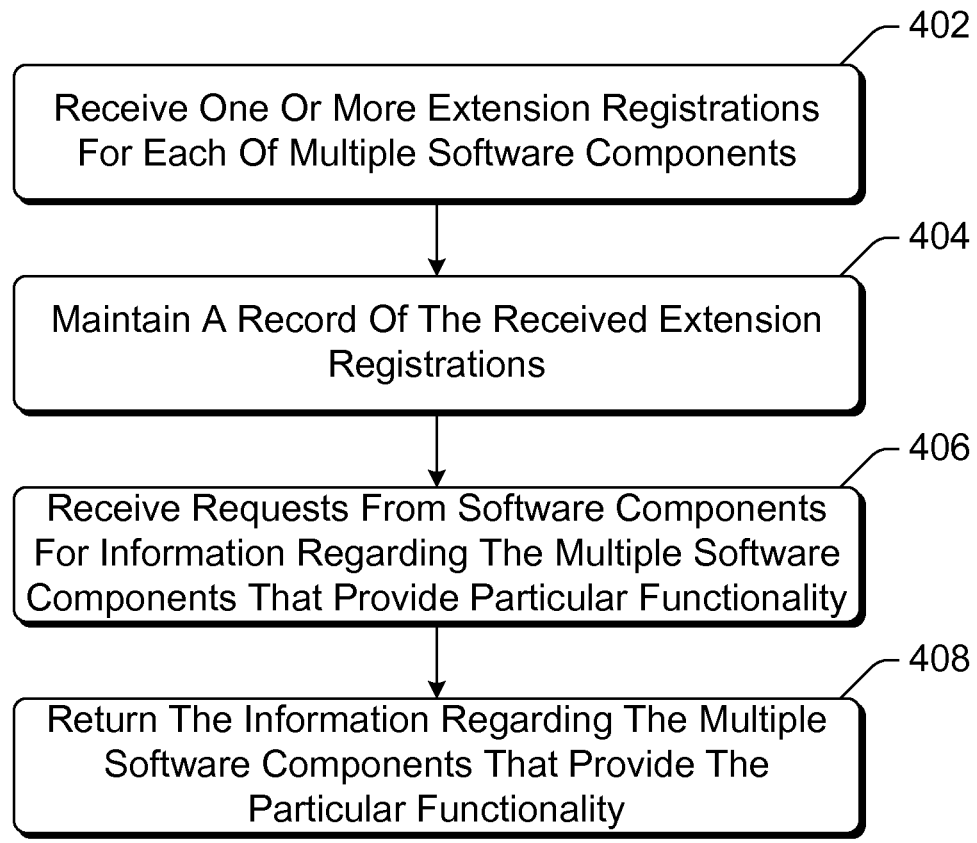
FIG. 4 is a flowchart illustrating an example process for implementing managed system extensibility in accordance with one or more embodiments.

FIG. 4 is a flowchart illustrating an example process 400 for implementing managed system extensibility in accordance with one or more embodiments. Process 400 is carried out by an extension management module of an operating system running on a device, such as extension management module 104 of FIG. 1, and can be implemented in software, firmware, hardware, or combinations thereof. Process 400 is an example process for implementing managed system extensibility; additional discussions of implementing managed system extensibility are included herein with reference to different figures.

In process 400, one or more extension registrations for each of multiple software components is received (act 402). These multiple software components are also referred to as extension providers as discussed above. These extension registrations can be received as extension registration declarations from software component manifest as discussed above. These extension registrations can also be received in different manners as discussed above, such as by the extension management module accessing the manifest or other declaration of the extension registration declarations, via an API of the extension management module being invoked, and so forth.

A record of the received extension registrations is maintained (act 404). This record is an extension registration database as discussed above, such as database 106 of FIG. 1 or database 300 of FIG. 3. Extension registrations can be added to and/or removed from the extension registration database at various times, as discussed above.

Additionally, requests are received from software components for information regarding the multiple software components that provide particular functionality (act 406). These requests identify the particular functionality. These software components from which the requests are received are also referred to as extension consumers as discussed above. The requests can be received from the software components from which the extension registrations are received in act 402 and/or other software components. The information being requested can be requested in a variety of different manners such as by submitting an enumerate registrations request to carry out the enumerate registrations operation discussed above. For example, following some of the examples above, a request received in act 406 can be a request for information identifying extension providers 114 that can interpret and operate on image files stored in the JPEG format.

In response to such requests, information regarding the multiple software components that provide the particular functionality is returned to the caller (act 408). Information that is returned is obtained by the extension management module from the record of received extension registrations that is maintained. The information returned to the caller in act 408 can vary. In one or more embodiments, the information returned is the extension registrations that provide the particular requested functionality. In other embodiments, the information returned is one or more objects or handles corresponding to the extension registrations that provide the particular requested functionality, and these one or more objects or handles can subsequently be used by the caller to retrieve data or metadata from the extension registrations (via subsequent requests to the extension management module).

In one or more embodiments, the request received in act 406 identifies the particular functionality by including a category identifier in the request. In response to such a request, information regarding all the extension registrations in the identified category (or having the category identifier) of the extension registration database is returned in act 408. For example, the request could include a category identifier for shortcut items, and in response information regarding all the shortcut item extension registrations in the extension registration database is returned in act 408.

In other embodiments, the request received in act 406 identifies the particular functionality by including an indication of one or more registration parameter names and corresponding values (and optionally including a category identifier). In response to such a request, information regarding all the extension registrations having the identified one or more registration parameter names and corresponding values (and, if a category identifier is included in the request, that also are in the identified category or have the category identifier) is returned in act 408. For example, the request could include a category identifier for file associations, and a registration parameter name and value of a file association name of ".jpg". In response to such a request, information regarding all the file association extension registrations in the extension registration database that have a registration parameter name and value of a file association name of ".jpg" is returned in act 408.

Figure 5:
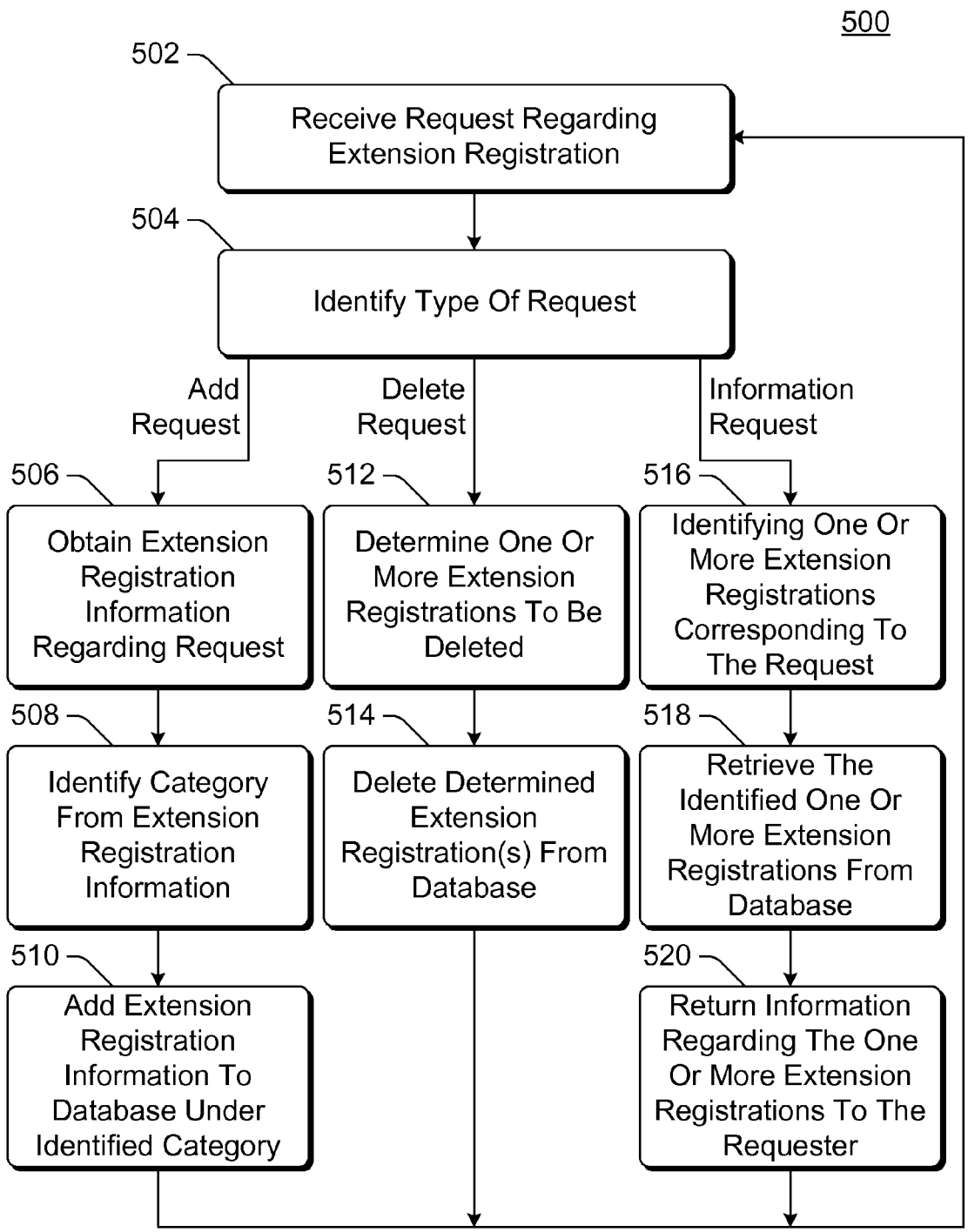
FIG. 5 is a flowchart illustrating another example process for implementing managed system extensibility in accordance with one or more embodiments.

FIG. 5 is a flowchart illustrating an example process 500 for implementing managed system extensibility in accordance with one or more embodiments. Process 500 is carried out by an extension management module of an operating system running on a device, such as extension management module 104 of FIG. 1, and can be implemented in software, firmware, hardware, or combinations thereof. Process 500 is an example process for implementing managed system extensibility; additional discussions of implementing managed system extensibility are included herein with reference to different figures.

In process 500, a request regarding an extension registration is received (act 502). These requests can be received in different manners as discussed above, such as by the extension management module accessing the manifest or other declaration of the extension registration declarations, via an API of the extension management module being invoked, and so forth.

A type of the received request is identified (act 504). A variety of different types of requests can be received. In one or more embodiments, the types of requests that can be received include add requests, delete requests, and information requests.

Add requests can be received at different times, such as when a software component is being installed on the computing device implementing process 500, or when a software component is dynamically registering an extension registration. In response to an add request, extension registration information regarding the request is obtained (act 506). The extension registration information refers to the data and metadata of the extension registration that is to be added to the extension registration database. The extension registration information can be received as part of the request or alternatively can be obtained in other manners such as by accessing a manifest or other declaration that includes the extension registration information.

A category for the extension registration information is identified (act 508). An identifier of this category is included in the extension registration information as discussed above.

The extension registration information is added to the extension registration database as an extension registration under the identified category (act 510). Alternatively, if the extension registration database is not organized by category, the extension registration information including the category identifier is added to the extension registration database. As part of the adding of the extension registration information in act 510, a change number for the category for the extension registration can be updated as discussed above. Additionally, another component or module that has requested notification of changes to the extension registration database can also be notified of this added extension registration as discussed above. Process 500 then proceeds to act 502 to receive an additional request regarding an extension registration.

Returning to act 504, delete requests can be received at different times, such as when a software component is being uninstalled from the computing device implementing process 500. In response to a delete request, one or more extension registrations to be deleted from the extension registration database are determined (act 512). The extension registrations that are to be deleted can be determined in different manners. For example, the delete request can include registration names identifying the particular extension registrations that are to be deleted. By way of another example, a manifest or other declaration that identifies particular extension registrations that are to be deleted can be accessed. By way of yet another example, the delete request can include an indication of a software component being uninstalled. The extension registration database can be searched to identify, as the particular extension registrations that are to be deleted, the extension registrations that correspond to that software component. Information indicating the software component to which each extension registration corresponds can be maintained in a variety of different manners as discussed above.

The one or more extension registrations determined in act 512 are deleted from the extension registration database (act 514). As part of the deleting of the extension registration in act 514, a change number for the category for the extension registration can be updated as discussed above. Additionally, another component or module that has requested notification of changes to the extension registration database can also be notified of this deleted extension registration as discussed above. Process 500 then proceeds to act 502 to receive an additional request regarding an extension registration.

Returning to act 504, information requests can be received at different times, such as when an extension consumer desires to identify an extension provider that provides particular functionality. In response to an information request, the extension management module identifies one or more extension registrations corresponding to the request (act 516). The one or more extension registrations corresponding to the request can be identified in different manners based on the particular request. The request can specify, for example, a particular category identifier, a particular extension registration, a particular registration parameter, and so forth. The one or more extension registrations in the extension registration database satisfying the parameters included in the request are identified in act 516.

The one or more extension registrations identified in act 516 are retrieved from the extension registration database (act 518). Information regarding the retrieved one or more extension registrations is returned to the requester (act 520). The information returned in act 520 can vary. In one or more embodiments, the information returned is the one or more extension registrations that are retrieved in act 518, or the particular requested data or metadata from the one or more extension registrations retrieved in act 518. In other embodiments, other information is returned, such as one or more objects or handles corresponding to the one or more extension registrations that are retrieved in act 518, and these one or more objects or handles can subsequently be used by the requester to retrieve data or metadata from the extension registrations (via subsequent information requests). Process 500 then proceeds to act 502 to receive an additional request regarding an extension registration.

Figure 6:
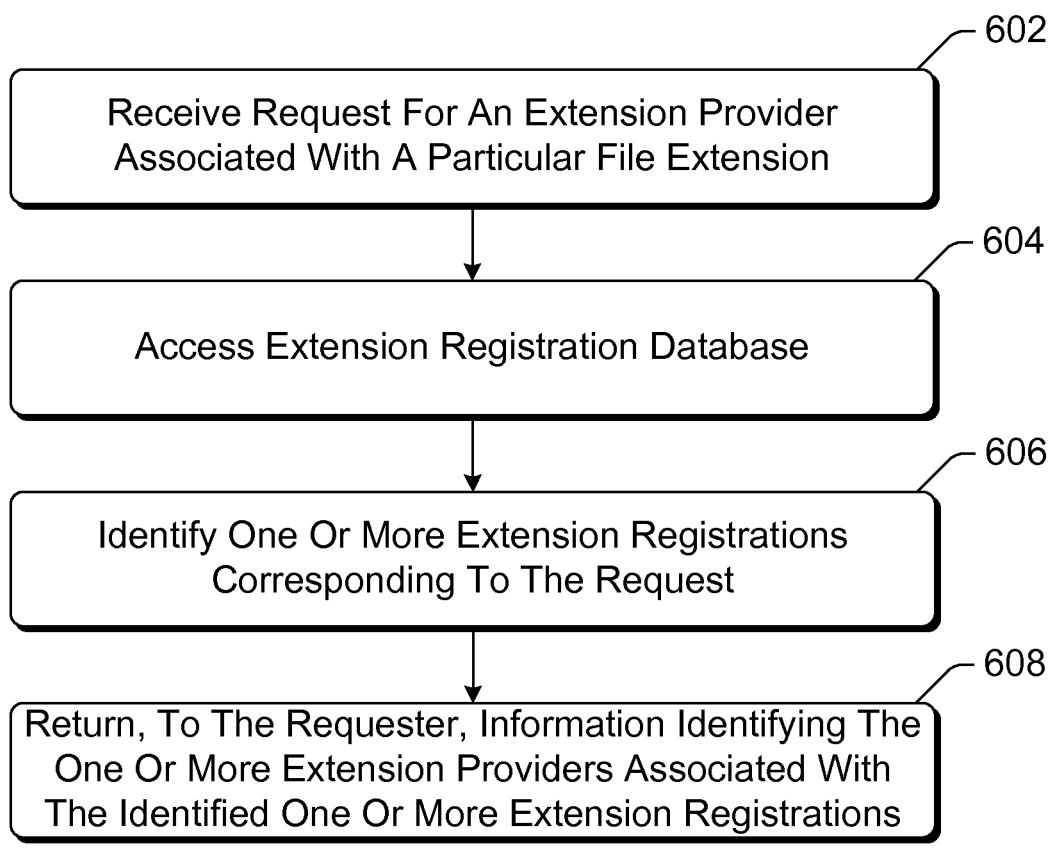
FIG. 6 is a flowchart illustrating an example process for using the managed system extensibility to identify an extension provider associated with a particular file extension in accordance with one or more embodiments.

FIG. 6 is a flowchart illustrating an example process 600 for using the managed system extensibility to identify an extension provider associated with a particular file extension in accordance with one or more embodiments. Process 600 is carried out by an extension management module of an operating system running on a device, such as extension management module 104 of FIG. 1, and can be implemented in software, firmware, hardware, or combinations thereof. Process 600 is an example process for using the managed system extensibility; additional discussions of using the managed system extensibility are included herein with reference to different figures.

In process 600, a request for an extension provider associated with a particular file extension is received (act 602). The request received in act 602 specifies (e.g., as a registration parameter) a particular file extension, such as a ".jpg" extension, a ".gif", a ".mp3" extension, and so forth. The request is typically received from an extension consumer that is a component or module of the operating system on the device implementing process 600, although alternatively the request can be received from other components are modules.

In response to the request, an extension registration database is accessed (act 604). The extension registration database includes a category of file association extensions. The extension registration database can be organized by category and/or each extension registration can include a category identifier as discussed above.

One or more extension registrations in the extension registration database that correspond to the request received an act 602 are identified (act 606). Each extension registration for a file association in the extension registration database includes an identifier of a file extension (e.g., as a registration parameter). Each extension registration that includes the file extension specified in the request received in act 602 is identified in act 606.

Information identifying the one or more extension providers associated with the registrations identified in act 606 is returned to the requester (act 608). This information is obtained from the one or more extension registrations in act 606 (e.g., the extension data and/or metadata). This information can include, for example, an identification or description of the one or more extension providers, file paths to executable files to execute the one or more extension providers, and so forth. The requester can then use this information as desired (e.g., to identify a file path to an extension provider that can be executed to interpret and operate on a file having the particular file extension identified in the request in act 602).

Additionally, as discussed above one type of extension is a DLL. Extension registrations can be included in the extension registration database that identify particular DLLs. Each such extension registration typically includes an identifier of the corresponding software component as well as data identifying a location in a file system of the operating system where the DLL is stored.

Figure 7:
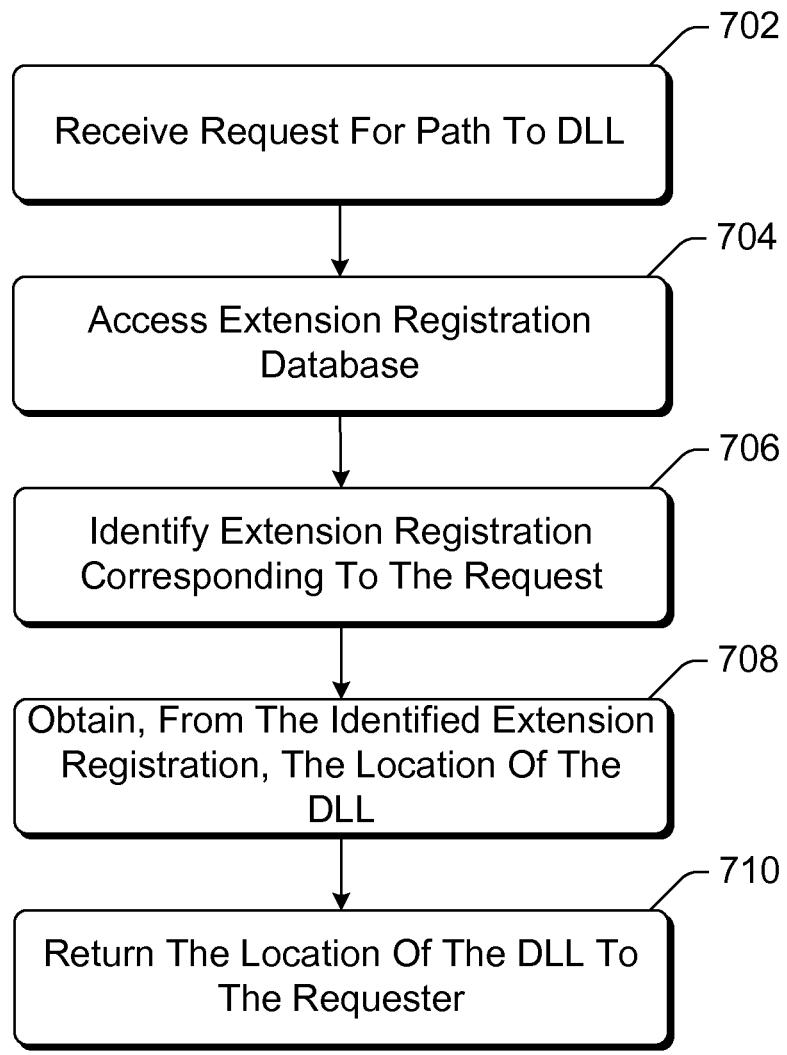
FIG. 7 is a flowchart illustrating an example process for using the managed system extensibility to obtain dynamic link library (DLL) locations in accordance with one or more embodiments.

FIG. 7 is a flowchart illustrating an example process 700 for using the managed system extensibility to obtain DLL locations in accordance with one or more embodiments. Process 700 is carried out by an extension management module of an operating system running on a device, such as extension management module 104 of FIG. 1, and can be implemented in software, firmware, hardware, or combinations thereof. Process 700 is an example process for using the managed system extensibility; additional discussions of using the managed system extensibility are included herein with reference to different figures.

In process 700, a request for a path to a DLL is received (act 702). A DLL is included as a resource file of a software component (e.g., a resource file 202 of FIG. 2). The request received in act 702 specifies (e.g., as a registration parameter) the particular DLL desired as well as a corresponding software component that includes the DLL. The request is typically received from an extension consumer that is a component or module of the operating system on the device implementing process 700, although alternatively the request can be received from other components or modules.

In response to the request, an extension registration database is accessed (act 704). The extension registration database includes a category of DLL extensions. The extension registration database can be organized by category and/or each extension registration can include a category identifier as discussed above.

An extension registration in the extension registration database that corresponds to the request received in act 702 is identified (act 706). Each extension registration for a DLL in the extension registration database includes an identifier of the DLL (e.g., as a registration parameter), an identifier of a corresponding software component that includes the DLL (e.g., as metadata), and the location in the file system where the DLL is stored (e.g., as a registration parameter). The extension registration that includes both an identifier of the DLL specified in the request received in act 702 and an identifier of the software component specified in the request received in act 702 as the corresponding software component is identified in act 706.

The location in the file system of the DLL is obtained from the extension registration identified in act 706 (act 708). This location of the DLL obtained in act 706 is returned to the requester (act 710). The requester can then access the DLL at the identified location and load or otherwise use the DLL as desired.

As can be seen in process 700, searching through one or more directories or folders in a file system to locate a particular DLL need not be performed. Rather, the location of the DLL is readily determined by the extension management module based on the extension registrations maintained in the extension registration database.

In the discussions herein, the extension management module is described as maintaining a record of one or more extension registrations in an extension registration database (e.g., database 106 of FIG. 1 or database 300 of FIG. 3). Alternatively, no such separate record or database need be maintained. Rather, the manifest of each software component installed on the computing device (e.g., manifest 204 of FIG. 2) can be maintained and searched in response to requests from extension consumers.

Additionally, it should be noted that situations can arise where an extension registration database (e.g., database 106 of FIG. 1 or database 300 of FIG. 3) is accessed directly by another device. Such accesses need not be managed by an extension management module (e.g., module 104 of FIG. 1). For example, referring to FIG. 1, a second computing device (not shown in FIG. 1) coupled to computing device 100 can access a storage device of computing device 100 where extension registration database 106 is stored. This second computing device can be, for example, a computing device run by a system or network administrator, a third party that updates or manages computing device 100, and so forth. This second computing device can access database 106 directly, bypassing extension management module 104, and make changes to database 106. This allows, for example, the second computing device to add extension registrations to database 106, remove extension registrations from database 106, and/or otherwise access extension registrations in database 106 without extension management module 104 running. Accordingly, extension registration database 106 can be updated even when "offline" (e.g., when no user is logged into computing device 100 and/or extension management module 104 is not running).

In the discussions above, an extension management module operates as a broker between extension providers and extension consumers. Both extension providers and extension consumers have knowledge of the extension management module and how to communicate with the extension management module. However, situations can arise where a legacy provider and/or legacy consumer is run on the computing device. A legacy provider or legacy consumer refers to a program or module that operates without making use of the extension management module. Accordingly, legacy providers and legacy consumers do not have the knowledge of how to communicate with the extension management module.

To resolve such situations, a legacy management system is employed. The legacy management system supports translation of legacy providers into a new model that understands how to communicate with the extension management module. The legacy management system further supports legacy registration stores, configurations, and communications to allow registrations performed by extension providers via the extension management module to be made available to legacy consumers.

Figure 8:
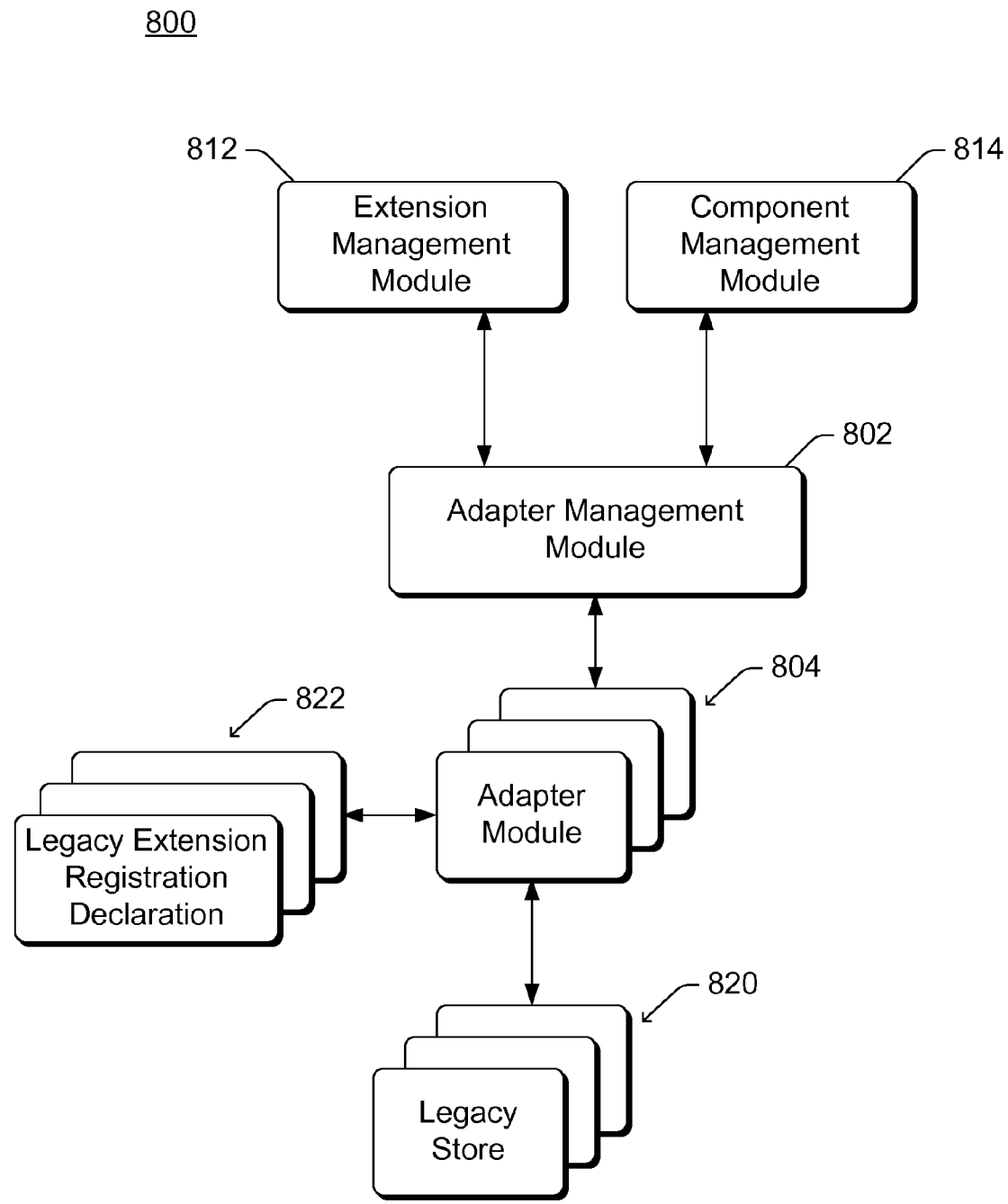
FIG. 8 illustrates an example legacy management system in accordance with one or more embodiments.

FIG. 8 illustrates an example legacy management system 800 in accordance with one or more embodiments. Legacy management system 800 is implemented as part of an operating system, such as operating system 102 of FIG. 1. Legacy management system 800 includes an adapter management module 802 and one or more adapter modules 804. Extension management module 812 is an extension management module as discussed above (e.g., module 104 of FIG. 1). Component management module 814 manages other aspects of software components other than the extensibility managed by module 812. For example, module 814 can manage the storage of state information for the software components.

As discussed above, extension registrations are added to an extension registration database by an extension management module such as module 812. This can occur when a software component is installed on a computing device as well as at other times. Adapter management module 802 detects when a change is made to the extension registration database by module 812. Adapter management module 802 can detect such changes in a variety of different manners. In one or more embodiments, module 802 registers with extension management module 812 to receive notifications of such changes. In response to such a registration, module 812 sends a notification to module 802 when a change is made to the extension registration database by module 812. Alternatively, module 802 can detect such changes in different manners, such as polling module 812 for the registrations in the extension registration database and checking whether any changes occurred since the last polling module 812, being informed of such changes by another component or module, and so forth.

When adapter management module 802 detects a change that is made to the extension registration database by module 812, module 802 notifies one or more adapter modules 804 of the change. Each adapter module 804 communicates with a corresponding legacy store 820. Each adapter module 804 has knowledge of how to communicate with the corresponding legacy store 820, as well as how to convert an extension registration from the extension registration database into a format used by the corresponding legacy store 820. In one or more embodiments, the developer of each adapter module 804 configures the adapter module 804 with the knowledge of how to perform this communication and conversion for particular types of extensions. Alternatively, one or more legacy extension registration declarations 822 can be provided to the adapter module 804 directly or via adapter management module 802. Each such legacy extension registration declaration 822 describes how to perform this communication and conversion for a particular type of extension.

Legacy stores 820 are stores used by legacy extension consumers and/or legacy extension providers to store information regarding extensibility. A variety of different types of stores can be included as legacy stores 820. For example, legacy stores 820 can include an operating system registry, a service control manager store, a firewall, a file system, a configuration file, and so forth.

Accordingly, when an extension registration for a software component that is an extension provider is added to an extension registration database by module 812, this addition is detected by module 802. Module 802 obtains the added extension registration from module 812 and forwards the extension registration to an adapter module 804. The adapter module 804 receives the extension registration, analyzes the extension registration, and stores the appropriate information in a legacy store 820 based on the extension registration. As the extension registration information for the software component is now included in a legacy store 820, a legacy extension consumer can identify and invoke the extension provider.

The particular adapter module 804 to which the extension registration is forwarded can be determined in different manners. In one or more embodiments, different adapter modules 804 handle different types of extension registrations and these different types are known to module 802. Alternatively, module 802 can query an adapter module 804 for the types of extension registrations the adapter module 804 can handle. Accordingly, given an extension registration, module 802 can forward the extension registration to the appropriate adapter module 804 based on the type of the extension registration. Alternatively, module 802 can determine the adapter module 804 to which an extension registration is forwarded in different manners. For example, extension registrations can be forwarded to all of the adapter modules 804, and each adapter module 804 can determine the appropriate information, if any, from the extension registration to store in a legacy store 820.

Figure 9:
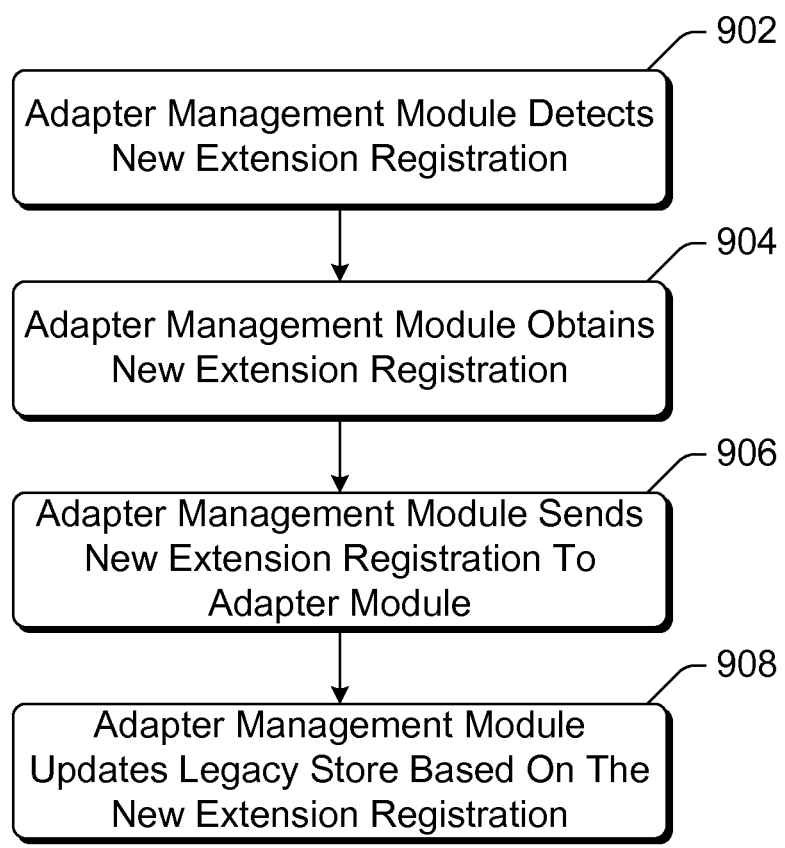
FIG. 9 is a flowchart illustrating an example process for supporting legacy extension consumers with the managed system extensibility in accordance with one or more embodiments.

FIG. 9 is a flowchart illustrating an example process 900 for supporting legacy extension consumers with the managed system extensibility in accordance with one or more embodiments. Process 900 is carried out by a legacy management system of an operating system running on a device, such as legacy management system 800 of FIG. 8, and can be implemented in software, firmware, hardware, or combinations thereof. Process 900 is an example process for supporting legacy extension consumers; additional discussions of supporting legacy extension consumers are included herein with reference to different figures.

In process 900, an adapter management module detects a new extension registration (act 902). This detection can be performed in a variety of different manners as discussed above, such as registering with an extension management module for changes to the extension registration database.

In response to a new extension registration being detected, the adapter management module obtains the new extension registration (act 904). The adapter management module can obtain the new extension registration in a variety of manners, such as being passed the new extension registration with the notification of the change to the extension registration database, by requesting the new extension registration from the extension management module, by accessing a location where the new extension registration is known to be stored, and so forth.

The adapter management module then sends the new extension registration to an adapter module (act 906). The particular adapter module or modules to which the new extension registration is sent can be determined in a variety of different manners as discussed above.

The adapter management module then updates a corresponding legacy store based on the new extension registration (act 908). As discussed above, the adapter management module is able to communicate with the legacy store and store information from the new extension registration into the legacy store in a manner expected by the legacy store and legacy extension consumers.

Figure 10:
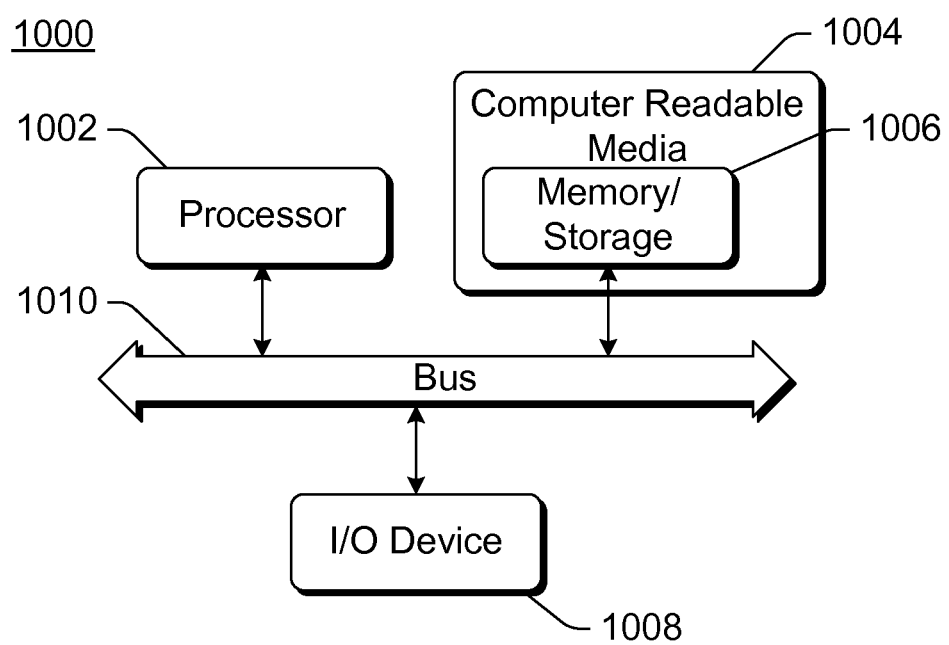
FIG. 10 illustrates an example computing device that can be configured to implement the managed system extensibility in accordance with one or more embodiments.

FIG. 10 illustrates an example computing device 1000 that can be configured to implement the managed system extensibility in accordance with one or more embodiments. Computing device 1000 can be, for example, computing device 100 of FIG. 1.

Computing device 1000 includes one or more processors or processing units 1002, one or more computer readable media 1004 which can include one or more memory and/or storage components 1006, one or more input/output (I/O) devices 1008, and a bus 1010 that allows the various components and devices to communicate with one another. Computer readable media 1004 and/or one or more I/O devices 1008 can be included as part of, or alternatively may be coupled to, computing device 1000. Bus 1010 represents one or more of several types of bus structures, including a memory bus or memory controller, a peripheral bus, an accelerated graphics port, a processor or local bus, and so forth using a variety of different bus architectures. Bus 1010 can include wired and/or wireless buses.

Memory/storage component 1006 represents one or more computer storage media. Component 1006 can include volatile media (such as random access memory (RAM)) and/or nonvolatile media (such as read only memory (ROM), Flash memory, optical disks, magnetic disks, and so forth). Component 1006 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1002. It is to be appreciated that different instructions can be stored in different components of computing device 1000, such as in a processing unit 1002, in various cache memories of a processing unit 1002, in other cache memories of device 1000 (not shown), on other computer readable media, and so forth. Additionally, it is to be appreciated that the location where instructions are stored in computing device 1000 can change over time.

One or more input/output devices 1008 allow a user to enter commands and information to computing device 1000, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, although can alternatively also incorporate firmware and/or hardware. In the case of a software implementation, the module or component represents program code that performs specified tasks when executed on a processor (e.g., CPU or CPUs). The program code can be stored in one or more computer readable memory devices, further description of which may be found with reference to FIG. 10. The features of the managed system extensibility described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage memories having stored thereon multiple instructions of an operating system that, when executed by one or more processors of a computing device, cause the one or more processors to:
- receive, for each of multiple software components installed on the computing device, one or more extension registrations identifying the software component as a provider of functionality;
- maintain a record of the one or more extension registrations for each of the multiple software components;
- receive requests, from other software components installed on the computing device, that identify particular functionality; and
- return to the other software components, in response to the requests and based on the record, information regarding one or more of the multiple software components that provide the particular functionality
- receive an indication that one of the multiple software components is to be uninstalled from the computing device;
- identify the one or more extension registrations in the record that correspond to the one of the multiple software components; and
- delete from the record the one or more extension registrations that correspond to the one of the multiple software components.

2. One or more computer storage memories as recited in claim 1, wherein to receive the one or more extension registrations for a software component is to obtain the one or more extension registrations from a manifest of the software component when the software component is installed on the computing device.

3. One or more computer storage memories as recited in claim 1, wherein to receive the one or more extension registrations for a software component is to receive, via an application programming interface method invoked by the software component, the one or more extension registrations from the software component.

4. One or more computer storage memories as recited in claim 1, wherein to receive the requests from other software components is to receive requests from the other software components via an application programming interface exposed by an extension management module of the operating system.

5. One or more computer storage memories as recited in claim 1, wherein the one or more extension registrations comprise multiple extension registrations, and different ones of the multiple extension registrations comprise different types of extensions.

6. One or more computer storage memories as recited in claim 1, wherein each of the one or more extension registrations includes both metadata describing the extension registration and one or more registration parameters for the extension registration.

7. One or more computer storage memories as recited in claim 6, wherein each of the one or more registration parameters comprises a registration parameter name, a registration parameter type, and a registration parameter value.

8. One or more computer storage memories as recited in claim 1, wherein the multiple instructions further cause the one or more processors to convert at least one of the one or more extension registrations into a format used by a legacy store, and store the converted at least one extension registration in the legacy store.

9. One or more computer storage memories as recited in claim 1, wherein the one or more extension registrations maintained in the record comprise multiple different types of extensions.

10. One or more computer storage memories as recited in claim 9, wherein the one or more extension registrations include at least one file association, at least one menu item, and at least one shortcut item.

11. One or more computer storage memories as recited in claim 1, wherein each of the one or more extension registrations has a category identifier indicating an extension type of the extension registration, and wherein each of the one or more extension registrations conforms to a category definition defined for the category identifier of the extension registration.

12. One or more computer storage memories as recited in claim 1, wherein the multiple instructions further cause the one or more processors to send, to another module of the computing device, a notification of changes to the record of the one or more extension registrations.

13. A method implemented in an operating system running on a computing device, the method comprising:
- obtaining a new extension registration from an extension management module that manages access to an extension registration database, the new extension registration corresponding to an extension provider that communicates with the extension management module;
- storing, in a legacy store, extension information based on the new extension registration; and
- registering with the extension management module to receive notifications of changes to the extension registration database.

14. A method as recited in claim 13,
wherein the obtaining comprises obtaining a new extension registration in response to a notification of a change to the extension registration database received from extension management module.

15. A method as recited in claim 13, further comprising:
- receiving, from the extension management module, a notification of when an extension registration is removed from the extension registration database; and
- removing, from the legacy store, extension information corresponding to the extension registration.

16. A method as recited in claim 13, further comprising accessing a legacy extension registration declaration to determine how to convert the new extension registration into a format used by the legacy store.

17. A method as recited in claim 13, wherein the legacy store comprises an operating system registry.

18. A method as recited in claim 13, wherein the extension registration database includes multiple different types of extensions.

19. One or more computer storage memories having stored thereon multiple instructions of an operating system that, when executed by one or more processors of a computing device, cause the one or more processors to:
- receive, from a requester executing on the computing device, a request for a path to a dynamic link library, the request specifying both an identifier of the dynamic link library and an identifier of a corresponding software component that includes the dynamic link library;
- access, in response to the request, an extension registration database that includes multiple extension registrations including extension registrations for both dynamic link libraries and file associations;
- identify an extension registration in the extension registration database that corresponds to the request by identifying the extension registration in the extension registration database that includes both the identifier of the dynamic link library and the identifier of the corresponding software component specified in the request;

obtain, from the extension registration, a location of the dynamic link library; and return, to the requester, the location of the dynamic link library.

* * * * *